Patented May 3, 1949

2,469,081

UNITED STATES PATENT OFFICE 2,469,081

REFRACTORY CONCRETE, MIX THEREFOR, AND METHOD OF MAKING

Arthur F. Ruedi, Hammond, Ind., assignor to Universal Atlas Cement Company, a corporation of Indiana No Drawing. Application February 28, 1947, Serial No. 731,714

13 Claims. (Cl. 106—58)

This invention relates to an improved refractory concrete employing vermiculite as at least the predominant portion of the aggregate therein and calcium aluminate cement as the bond forming component therein. The invention further relates to the mix for making such concrete, and to the method of making the concrete.

It has been found that refractory shapes made of a concrete containing vermiculite as at least a predominant portion of the aggregate, and calcium aluminate cement, have a rather low early strength. The low early strength of such refractory concrete employing calcium aluminate cement and an aggregate at least the predominant portion of which is vermiculite has proved to be a serious disadvantage, since precast shapes and the like of this material must be allowed to stand for several days before they can be handled and shipped. It is an object of the present invention, therefore, to improve the early strength of such refractory concrete so that as soon as 24 hours after casting the shapes may be handled in a manner incidental to normal shipping operations without danger of breakage.

In accordance with the present invention this result is accomplished by the addition to the vermiculite-calcium aluminate mixes defined above, of magnesium chloride ($MgCl_2$) within the limits of 0.5 to 3.5% by weight of the total mix. It has been found preferable in most instances to employ $MgCl_2$ in the somewhat narrower limits of 1.0 to 3.0% by weight of the total mix.

The vermiculite which is employed as at least a predominant portion of the aggregate in the concrete is that which is obtained by the heating of mica to cause it to expand and delaminate to form a rather light porous structure. Such vermiculite is also sometimes called exfoliated mica. Ordinarily, in the refractory concrete with which the invention is concerned, the refractory aggregate consists entirely of such vermiculite or exfoliated mica. It is to be understood, however, that the invention is not confined thereto but that it includes refractory concretes in which at least a predominant part of the refractory aggregate is such vermiculite. For the purposes of the invention "predominant" may be defined as at least 66⅔% of the total aggregate in the mix. The remainder of the aggregate, if such aggregate is not 100% vermiculite, may be any other refractory material such as fire clay grog, diatomaceous earth, crushed firebrick, expanded shale, and the like.

The calcium aluminate cement employed is one which is also referred to as high alumina, or fused cement.

The ratio of the amounts of calcium aluminate cement and refractory aggregate used in the concrete depends upon the properties desired in the resulting concrete. Thus, to form high strength, dense concrete of low thermal insulating value, the calcium aluminate cement and the refractory aggregate may be employed in a ratio as small as 1:1 by volume. Where high insulating properties are desired in the concrete, and the strength of the shape is a secondary consideration, such ratio by volume may be as high as 1:8. For ordinary purposes, however, cement-aggregate ratios on a volume basis of 1:4 to 1:6 are usually employed.

The composition of the total mix, exclusive of water, on a weight basis, may vary within the following limits:

| | Per cent |
|---|---|
| Calcium aluminate cement | 50–92 |
| Refractory aggregate consisting predominantly of vermiculite | 4–50 |
| $MgCl_2$ | 0.5–3.5 |

The preferred mixes, in which the cement and refractory aggregate consisting predominantly of vermiculite have a volume ratio of 1:4 and 1:6, have compositions by weight exclusive of water, which lie within the following limits:

| | Per cent |
|---|---|
| Calcium aluminate cement | 60–76 |
| Refractory aggregate consisting predominantly of vermiculite | 20–45 |
| $MgCl_2$ | 0.5–3.5 |

The constituents of the mix are supplied thereto in either comminuted or granular form to allow them to be uniformly distributed throughout the mix and consequently the resulting concrete. Those constituents which form the bond are preferably finely ground to facilitate their reaction. The calcium aluminate cement, for example, may be made of such fineness that practically all particles will pass through a 100 mesh screen. The refractory aggregate consisting wholly or predominantly of vermiculite may be of any desired particle size, or range of particle sizes consistent with substantial uniformity of distribution throughout the resulting concrete. Naturally, in concrete of thinner section the aggregate particle size will be chosen smaller than for that in concrete of thick section. In the tests conducted which are set out in the tables below, the vermiculite was of the particle size known in the trade as "plaster size."

The mix may conveniently be made by thoroughly wetting down with water the refractory aggregate consisting wholly or predominantly of vermiculite and then adding thereto and mixing therewith the calcium aluminate cement. Sufficient water is added to the resulting mixture to render it workable, the magnesium chloride being conveniently added to the mix in such water. The amount of such added water depends, of course, upon the manner in which the mix is to be subsequently handled in the formation of the concrete shape or structure. Thus, if the concrete is to be cast into a mold or form, particularly if the shape is intricate, the mix should be of puddling consistency. For simple shapes so cast, less water may be used, whereas if the mix is to be tamped or vibrated into place or molded by pressure still less water may be used. It is obvious that sufficient water should be used in all cases to develop fully the hydraulic strength of the cement and that an excess of water should be avoided.

After the mixture has been shaped or molded in any one of the ways above described, it is cured in the natural atmosphere. Because the refractory aggregate consists wholly or predominantly of vermiculite, which is very porous and thus absorbs large amounts of water, it is not necessary to cure the concrete in a moist atmosphere as in a moist cabinet, since curing in the natural atmosphere has proved satisfactory.

Concrete resulting from mixes made in accordance with the present invention, after having been dried for 24 hours, possesses a compressive strength which is markedly greater than that of similar concretes containing no added $MgCl_2$. Such augmented compressive strength is strikingly shown by the tests set out in Tables I and II below. In each of the specimens of such tests the refractory aggregate consisted wholly of vermiculite, that designated "Libby" vermiculite being vermiculite processed from mica mined at Libby, Montana. Vermiculites A and B were those obtained from mica mined in two different locations other than Libby, Montana, further identification of such vermiculite not being furnished by the processor. For each of the numbered tests in the tables, there were provided three two-inch cube specimens made in the manner described above for a castable mix, and such mixes containing the indicated percentages by weight of the components designated. The compressive strength reported for each numbered test is the average of those of three such specimens. In Table I the specimens were all of a 1:4 mix, that is, one part of calcium aluminate cement to four parts vermiculite by volume. In Table II the specimens were all of a 1:6 mix by volume. The weight per cubic foot of both vermiculites A and B is 7.4 pounds, and that of Libby vermiculite is 9.0 pounds. By use of such figures the composition of each mix, on a weight basis, was calculated and it is on such basis that the compositions in the tables are reported.

TABLE I (1 part calcium aluminate cement : 4 parts vermiculite by volume)

| | $MgCl_2$, Per cent by wt. | Calcium Aluminate Cement, Per cent by wt. | Vermiculite, Per cent by wt. | 24 Hr. Compressive strength, p. s. i. | Percent Increase in Compressive Strength |
|---|---|---|---|---|---|
| 1 | 0 | 72.31 | Libby—27.69 | 203 | |
| | | | | | Over test 1 |
| 2 | 0.72 | 71.79 | Libby—27.48 | 312 | 53.60 |
| 3 | 1.44 | 71.26 | Libby—27.29 | 304 | 49.80 |
| 4 | 2.10 | 70.79 | Libby—27.11 | 374 | 84.20 |
| 5 | 0 | 76.05 | A—23.95 | 212 | |
| | | | | | Over test 5 |
| 6 | 0.75 | 75.49 | A—23.76 | 436 | 105.5 |
| 7 | 1.51 | 74.90 | A—23.58 | 438 | 106.5 |
| 8 | 2.21 | 74.37 | A—23.41 | 412 | 94.2 |
| 9 | 0 | 76.05 | B—23.95 | 243 | |
| | | | | | Over test 9 |
| 10 | 0.75 | 75.49 | B—23.76 | 365 | 49.8 |
| 11 | 1.51 | 74.90 | B—23.58 | 418 | 72.0 |
| 12 | 2.21 | 74.37 | B—23.41 | 416 | 71.2 |

TABLE II (1 part calcium aluminate cement : 6 parts vermiculite by volume)

| | $MgCl_2$, Per cent by wt. | Calcium Aluminate Cement, Per cent by wt. | Vermiculite, Per cent by wt. | 24 Hr. Compressive strength, p. s. i. | Percent Increase in Compressive Strength |
|---|---|---|---|---|---|
| 1 | 0 | 63.51 | Libby—36.49 | 43 | |
| | | | | | Over test 1 |
| 2 | 0.63 | 63.11 | Libby—36.26 | 51 | 18.6 |
| 3 | 1.26 | 62.71 | Libby—36.03 | 129 | 200.0 |
| 4 | 1.86 | 62.33 | Libby—35.81 | 100 | 132.8 |
| 5 | 0 | 67.90 | A—32.10 | 52 | |
| | | | | | Over test 5 |
| 6 | 0.67 | 67.46 | A—31.86 | 105 | 102.0 |
| 7 | 1.35 | 67.00 | A—31.64 | 203 | 290.0 |
| 8 | 1.99 | 66.57 | A—31.44 | 179 | 246.0 |
| 9 | 0 | 67.90 | B—32.10 | 58 | |
| | | | | | Over test 9 |
| 10 | 0.67 | 67.46 | B—31.86 | 101 | 74.2 |
| 11 | 1.35 | 67.00 | B—31.64 | 188 | 224.0 |
| 12 | 1.99 | 66.57 | B—31.44 | 107 | 84.5 |

It will be seen from the results set forth in Tables I and II that the addition of magnesium chloride within the indicated limits to mixes consisting wholly of, or at least predominantly of, vermiculite and calcium aluminate cement, markedly increases the 24 hour compressive strength of such mixes. As a result of the invention it is now possible to make and ship refractory concrete shapes made of such mix without delay.

Having thus disclosed preferred embodiments of the refractory concrete, the mix therefor, and the method of making such concrete, I therefore wish to claim as new the following.

I claim:

1. A mix for forming refractory concrete comprising calcium aluminate cement from 50 to 92% by weight of the mix, refractory aggregate from 4 to 50% by weight of the mix, said refractory aggregate consisting of at least 66⅔% by weight thereof expanded vermiculite, and $MgCl_2$ from 0.5 to 3.5 by weight of the mix.

2. A mix for forming refractory concrete comprising calcium aluminate cement from 50 to 92% by weight of the mix, refractory aggregate from 4 to 50% by weight of the mix, said refractory aggregate consisting substantially wholly of expanded vermiculite, and $MgCl_2$ from 0.5 to 3.5% by weight of the mix.

3. A mix for forming refractory concrete comprising calcium aluminate cement from 60 to 76% by weight of the mix, refractory aggregate from 20 to 45% by weight of the mix, said refractory aggregate consisting of at least 66⅔% by weight thereof expanded vermiculite, and $MgCl_2$ from 0.5 to 3.5% by weight of the mix.

4. A mix for forming refractory concrete comprising calcium aluminate cement from 60 to 76% by weight of the mix, refractory aggregate from 20 to 45% by weight of the mix, said refractory aggregate consisting substantially wholly of expanded vermiculite, and $MgCl_2$ from 0.5 to 3.5% by weight of the mix.

5. A mix for forming refractory concrete consisting of, exclusive of water, calcium aluminate cement from 60 to 76% by weight of the mix, expanded vermiculite from 20 to 45% by weight of the mix, and $MgCl_2$ from 0.5 to 3.5% by weight of the mix.

6. A refractory concrete formed from a mix comprising calcium aluminate cement from 50 to 92% by weight of the mix, refractory aggregate from 4 to 50% by weight of the mix, said refractory aggregate consisting of at least 66⅔% by weight thereof expanded vermiculite, and $MgCl_2$ from 0.5 to 3.5% by weight of the mix.

7. A refractory concrete formed from a mix comprising calcium aluminate cement from 50 to 92% by weight of the mix, refractory aggregate from 4 to 50% by weight of the mix, said refractory aggregate consisting substantially wholly of expanded vermiculite, and $MgCl_2$ from 0.5 to 3.5% by weight of the mix.

8. A refractory concrete formed from a mix comprising calcium aluminate cement from 60 to 76% by weight of the mix, refractory aggregate from 20 to 45% by weight of the mix, said refractory aggregate consisting of at least 66⅔% by weight thereof expanded vermiculite, and $MgCl_2$ from 0.5 to 3.5% by weight of the mix.

9. A refractory concrete formed from a mix comprising calcium aluminate cement from 60 to 76% by weight of the mix, refractory aggregate from 20 to 45% by weight of the mix, said refractory aggregate consisting substantially wholly of expanded vermiculite, and $MgCl_2$ from 0.5 to 3.5% by weight of the mix.

10. A refractory concrete formed from a mix consisting of, exclusive of water, calcium aluminate cement from 60 to 76% by weight of the mix, expanded vermiculite from 20 to 45% by weight of the mix, and $MgCl_2$ from 0.5 to 3.5% by weight of the mix.

11. The method of making refractory concrete which comprises forming a mix comprising calcium aluminate cement from 50 to 92% by weight of the mix, refractory aggregate from 4 to 50% by weight of the mix, the refractory aggregate consisting of at least 66⅔% by weight thereof expanded vermiculite, from 0.5 to 3.5% by weight of the mix $MgCl_2$, adding sufficient water fully to hydrate the mix and to form a workable mass, forming such mixture into the desired shape, and allowing the shape to dry and set.

12. The method of making refractory concrete which comprises forming a mix comprising calcium aluminate cement from 50 to 92% by weight of the mix, refractory aggregate from 4 to 50% by weight of the mix, the refractory aggregate consisting substantially wholly of expanded vermiculite, from 0.5 to 3.5% by weight of the mix $MgCl_2$, adding sufficient water fully to hydrate the mix and to form a workable mass, forming such mixture into the desired shape, and allowing the shape to dry and set.

13. The method of making refractory concrete which comprises forming a mix consisting of, exclusive of water, calcium aluminate cement from 60 to 76% by weight of the mix, expanded vermiculite from 20 to 45% by weight of the mix, from 0.5 to 3.5% by weight of the mix $MgCl_2$, adding sufficient water fully to hydrate the mix and to form a workable mass, forming such mixture into the desired shape, and allowing the shape to dry and set.

ARTHUR F. RUEDI.

REFERENCES CITED

The following references are of record in the file of this patent:

UNITED STATES PATENTS

| Number | Name | Date |
|---|---|---|
| 1,156,018 | Newberry | Oct. 5, 1915 |
| 2,043,249 | Jones | June 9, 1936 |
| 2,416,700 | Kocher | Mar. 4, 1947 |